US012246388B2

(12) United States Patent
Muto

(10) Patent No.: US 12,246,388 B2
(45) Date of Patent: Mar. 11, 2025

(54) METHOD OF RESISTANCE SPOT WELDING AND RESISTANCE SPOT WELDING APPARATUS

(71) Applicant: FUTABA INDUSTRIAL CO., LTD., Okazaki (JP)

(72) Inventor: Shota Muto, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 325 days.

(21) Appl. No.: 17/344,047

(22) Filed: Jun. 10, 2021

(65) Prior Publication Data
US 2022/0016726 A1 Jan. 20, 2022

(30) Foreign Application Priority Data
Jul. 15, 2020 (JP) .................. 2020-121332

(51) Int. Cl.
*B23K 11/11* (2006.01)
*B23K 11/16* (2006.01)
(Continued)

(52) U.S. Cl.
CPC ........... *B23K 11/115* (2013.01); *B23K 11/163* (2013.01); *B23K 11/3009* (2013.01); *B23K 11/364* (2013.01)

(58) Field of Classification Search
CPC ....... B23K 11/00; B23K 11/115; B23K 11/30; B23K 11/3009; B23K 11/165; B23K 11/365; B23K 11/11–12; B21D 5/00–01
See application file for complete search history.

(56) References Cited

U.S. PATENT DOCUMENTS

| 8,337,643 B2 * | 12/2012 | Sun .................. C22C 38/18 |
| | | 148/333 |
| 2008/0067215 A1 * | 3/2008 | Gendou ............. B23K 20/1265 |
| | | 228/112.1 |

(Continued)

FOREIGN PATENT DOCUMENTS

JP 2003251469 A 9/2003
JP 2011011253 A * 1/2011
(Continued)

OTHER PUBLICATIONS

Translation of JP-2011051013-A (Year: 2011).*
(Continued)

*Primary Examiner* — Elizabeth M Kerr
(74) *Attorney, Agent, or Firm* — Withrow + Terraova, PLLC; Vincent K. Gustafson

(57) ABSTRACT

The present disclosure provides a method of resistance spot welding that can inhibit Liquid Metal Embrittlement-induced cracking in zinc-coated steel plates irrespective of the degrees of tensile strength. One aspect of the present disclosure provides a method of resistance spot welding. The method comprises welding a workpiece with a resistance spot welding apparatus. The workpiece includes two or more steel plates in an overlapping state. The two or more steel plates include at least one steel plate coated with zinc. The welding includes welding while compressing a high-tensile steel plate among the two or more steel plates in a direction intersecting a direction of a thickness of the high-tensile steel plate. The high-tensile steel plate has a tensile strength higher than a tensile strength of another steel plate among the two or more steel plates.

4 Claims, 3 Drawing Sheets

(51) Int. Cl.
*B23K 11/30* (2006.01)
*B23K 11/36* (2006.01)

(56) References Cited

U.S. PATENT DOCUMENTS

| | | | | |
|---|---|---|---|---|
| 2012/0138194 A1* | 6/2012 | Sun | .................. | C22C 38/48 |
| | | | | 148/400 |
| 2016/0144449 A1* | 5/2016 | Matsushita | ........ | B23K 11/3009 |
| | | | | 219/86.32 |
| 2017/0008119 A1* | 1/2017 | Nakazawa | .............. | C22C 38/18 |
| 2019/0001428 A1* | 1/2019 | Yang | .................... | B32B 15/011 |
| 2019/0048910 A1* | 2/2019 | Iwase | ................... | F16B 11/006 |
| 2020/0290149 A1* | 9/2020 | Fujimoto | ............... | B23K 20/12 |

FOREIGN PATENT DOCUMENTS

| | | | | |
|---|---|---|---|---|
| JP | 2011051013 | A | * | 3/2011 |
| JP | 4728926 | B2 | | 7/2011 |
| JP | 2017047475 | A | | 3/2017 |
| JP | 2019171450 | A | | 10/2019 |
| JP | 2021126702 | A | | 9/2021 |
| WO | 2018117459 | A1 | | 6/2018 |

OTHER PUBLICATIONS

Notice of Reasons for Refusal for Japanese Patent Application No. 2020121332, mailed May 31, 2022, 8 pages.
Notice of the First Patent Examination Opinion for Chinese Patent Application No. 202110787874.6, mailed Aug. 24, 2022, 14 pages.

* cited by examiner

METHOD OF RESISTANCE SPOT WELDING AND RESISTANCE SPOT WELDING APPARATUS

CROSS-REFERENCE TO RELATED APPLICATION

The present application claims the benefit of Japanese Patent Application No. 2020-121332 filed on Jul. 15, 2020 with the Japan Patent Office, the entire disclosure of which is incorporated herein by reference.

BACKGROUND

The present disclosure relates to a method of resistance spot welding and a resistance spot welding apparatus.

Various methods are known for resistance spot welding of zinc-plated high-tensile steel plates with ordinary steel plates having low tensile strengths (see, for example, Japanese Unexamined Patent Application Publication No. 2017-047475).

SUMMARY

In the above-mentioned methods, keeping the total thickness of steel plates to be welded and the post-welding holding periods in certain ranges enables reduction of Liquid Metal Embrittlement (LME)-induced cracking, which results from zinc plating, in high-tensile steel plates.

However, a certain degree of tensile strength of ordinary steel plates to be welded may cause formation of nuggets on the high-tensile steel plate side and thus cause concentration of heat in high-tensile steel plates, generating relatively high tensile stress in the high-tensile steel plates. Accordingly, cracking may occur in the high-tensile steel plates.

It is desirable that one aspect of the present disclosure provides a method of resistance spot welding that can inhibit LME-induced cracking in zinc-coated steel plates irrespective of the degrees of tensile strength.

One aspect of the present disclosure provides a method of resistance spot welding. The method comprises welding a workpiece with a resistance spot welding apparatus. The workpiece includes two or more steel plates in an overlapping state. The two or more steel plates include at least one steel plate coated with zinc. The welding includes welding while compressing a high-tensile steel plate among the two or more steel plates in a direction intersecting a direction of a thickness of the high-tensile steel plate. The high-tensile steel plate has a tensile strength higher than a tensile strength of another steel plate among the two or more steel plates.

In the above-described configuration, generating the compressive stress in the high-tensile steel plate results in canceling the tensile stress generated in the high-tensile steel plate at the time of welding. This inhibits LME-induced cracking in the high-tensile steel plate irrespective of the degrees of the tensile strengths of the steel plates to be welded.

In one aspect of the present disclosure, the resistance spot welding apparatus may include a first electrode configured to be in contact with the high-tensile steel plate, and a second electrode configured such that the workpiece is interposed between the first electrode and the second electrode. The welding may comprise bending the high-tensile steel plate in a direction so that a weld portion of the high-tensile steel plate to be in contact with the first electrode is positioned inside of a bend. This configuration enables compression of the high-tensile steel plate with a relatively simple structure, thereby reducing the equipment cost of the resistance spot welding apparatus and reliably inhibiting LME-induced cracking.

In one aspect of the present disclosure, the bending the high-tensile steel plate may be performed by pressing the weld portion of the high-tensile steel plate with the first electrode. This configuration leads to use of the first and second electrodes of the resistance spot welding apparatus for relatively easy bending of the high-tensile steel plate, thereby simplifying the structure of the resistance spot welding apparatus.

Another aspect of the present disclosure provides a resistance spot welding apparatus configured to weld a workpiece including two or more steel plates in an overlapping state. The two or more steel plates include at least one steel plate coated with zinc. The resistance spot welding apparatus is configured to perform welding while compressing a high-tensile steel plate among the two or more steel plates in a direction intersecting a direction of a thickness of the high-tensile steel plate. The high-tensile steel plate has a tensile strength higher than a tensile strength of another steel plate among the two or more steel plates.

This configuration inhibits LME-induced cracking in the high-tensile steel plate irrespective of the degrees of the tensile strengths of the steel plates to be welded.

In one aspect of the present disclosure, the resistance spot welding apparatus may comprise a first electrode configured to be in contact with the high-tensile steel plate, a second electrode configured such that the workpiece is interposed between the first electrode and the second electrode, and a bending device configured to bend the high-tensile steel plate in a direction so that a weld portion of the high-tensile steel plate to be in contact with the first electrode is positioned inside of a bend. This configuration reduces the equipment cost of the resistance spot welding apparatus and reliably inhibits LME-induced cracking.

In one aspect of the present disclosure, the bending device may be configured to press the weld portion of the high-tensile steel plate with the first electrode so as to bend the high-tensile steel plate. This configuration can simplify the structure of the resistance spot welding apparatus.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

1-1. Configuration

Figure 1:
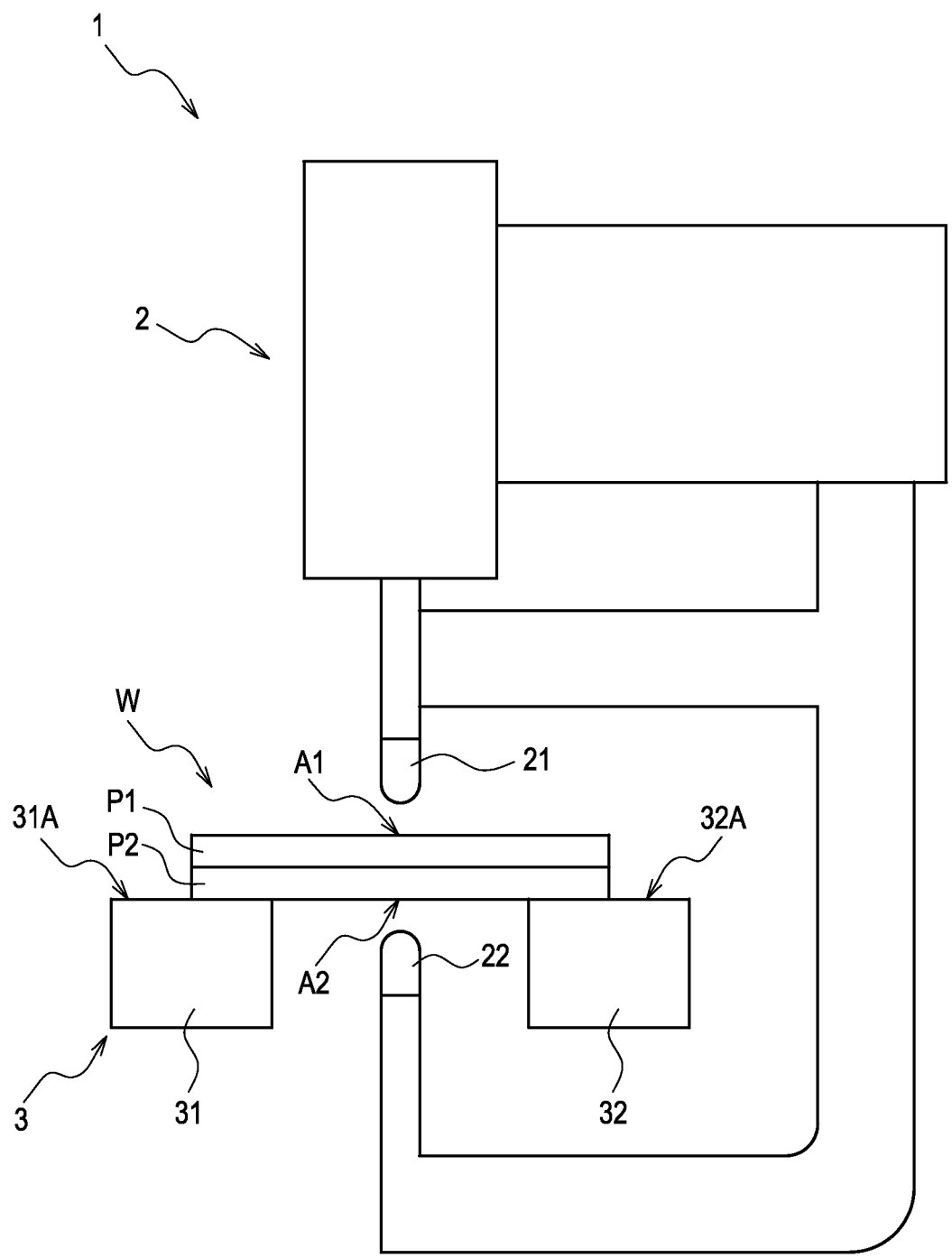
FIG. 1 is a schematic diagram showing a resistance spot welding apparatus according to an embodiment.

A resistance spot welding apparatus 1 shown in FIG. 1 is configured to weld a workpiece W including a high-tensile steel plate P1 and a low-tensile steel plate P2 in an overlapping state. The resistance spot welding apparatus 1 comprises a resistance welding device 2 and a bending device 3.

The high-tensile steel plate P1 has a tensile strength higher than that of the low-tensile steel plate P2. The tensile strength of the high-tensile steel plate P1 is, for example, 1470 MPa. The tensile strength of the low-tensile steel plate P2 is, for example, 440 MPa or 270 MPa. In the present embodiment, the high-tensile steel plate P1 is placed on top of the low-tensile steel plate P2.

At least one of the high-tensile steel plate P1 and the low-tensile steel plate P2 is coated with zinc. In the present embodiment, only the high-tensile steel plate P1 is coated with zinc while the low-tensile steel plate P2 is not coated with zinc. Alternatively, only the low-tensile steel plate P2 may be coated with zinc while the high-tensile steel plate P1 is not; or both the high-tensile steel plate P1 and the low-tensile steel plate P2 may be coated with zinc. The zinc used for plating includes zinc alloys.

<Resistance Welding Device>

The resistance welding device 2 welds the high-tensile steel plate P1 and the low-tensile steel plate P2, which are placed as a workpiece W, in the direction of the thicknesses (hereinafter "thickness direction") of the high-tensile and low-tensile steel plates P1, P2 by resistance spot welding.

The resistance welding device 2 comprises a first electrode 21 and a second electrode 22. The first electrode 21 is disposed to be positioned above the workpiece W. The second electrode 22 is disposed to be positioned below the workpiece W so that the workpiece W is interposed between the first and second electrodes 21, 22 in the thickness direction. The first electrode 21 is movable in the up-and-down directions relative to the second electrode 22.

The first and second electrodes 21, 22 each come into contact with the workpiece W when welding is performed. Specifically, the first electrode 21 is configured to be in contact with the high-tensile steel plate P1. The second electrode 22 is configured to be in contact with the low-tensile steel plate P2. A welding current flows between the first and second electrodes 21, 22 through the workpiece W.

<Bending Device>

Figure 2:
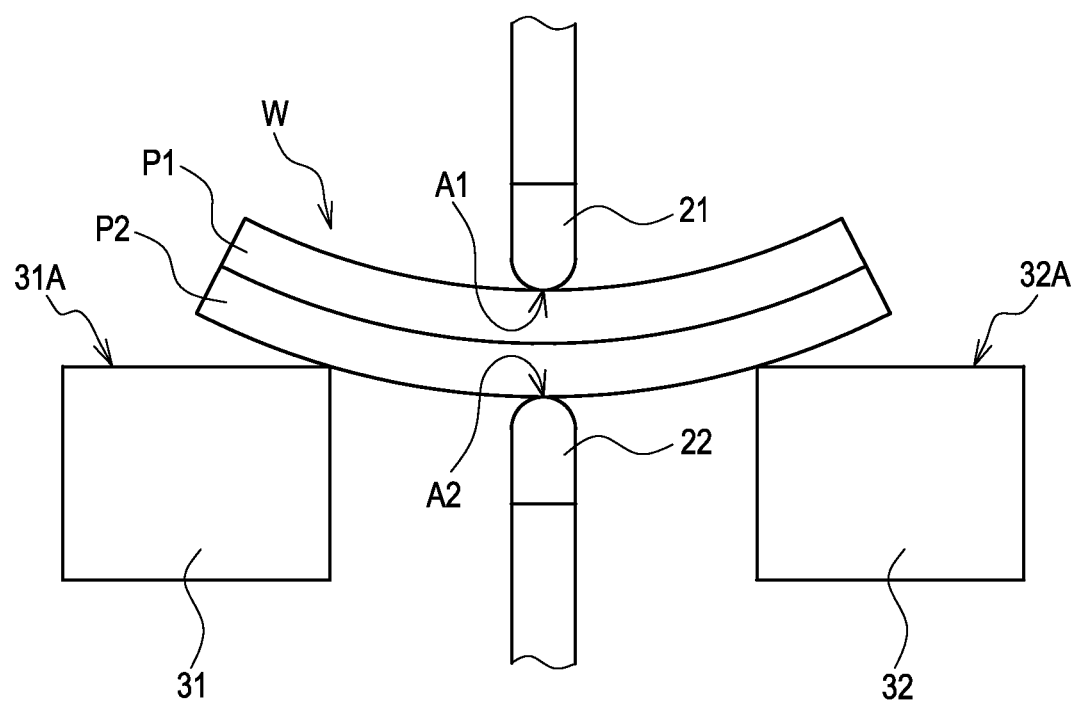
FIG. 2 is a schematic diagram illustrating a state of welding steel plates by the resistance spot welding apparatus.

As shown in FIG. 2, the bending device 3 is configured to bend the high-tensile steel plate P1 in a direction so that a weld portion A1 of the high-tensile steel plate P1, which comes into contact with the first electrode 21, is positioned inside the bend.

In other words, the bending device 3 bends the high-tensile steel plate P1 in the thickness direction so that the weld portion A1 is positioned lower than other portions of the high-tensile steel plate P1 (that is, the weld portion A1 protrudes downward).

Moreover, the bending device 3 is configured to bend the low-tensile steel plate P2 together with the high-tensile steel plate P1 in a direction in which a weld portion A2 of the low-tensile steel plate P2, which comes into contact with the second electrode 22, protrudes. The low-tensile steel plate P2 is bent while overlapping with the high-tensile steel plate P1.

The bending device 3 comprises a first jig 31 and a second jig 32. The first and second jigs 31, 32 are disposed away from each other such that the second electrode 22 is interposed therebetween in the horizontal direction. The first and second jigs 31, 32 respectively have upper surfaces 31A, 32A on which the workpiece W (specifically, the low-tensile steel plate P2) is placed.

The upper surfaces 31A, 32A are positioned above the tip of the second electrode 22 (that is, at a position near to the first electrode 21). On the upper surfaces 31A, 32A, the ends of the high-tensile steel plate P1 and the low-tensile steel plate P2 (that is, the portions outside of the weld portions A1, A2 in a planar view) are placed in an overlapping manner.

In the present embodiment, the upper surfaces 31A, 32A are flush with each other (that is, positioned at the same height) in the vertical direction. The vertical positions of the upper surfaces 31A, 32A, however, do not have to be the same; there may be a height difference of, for example, 10 mm. The distance (that is, the height difference) between the upper surfaces 31A, 32A and the tip of the second electrode 22 in the vertical direction is designed to be, for example, 1 mm or more depending on the thickness of the workpiece W.

As shown in FIG. 1, while the workpiece W is placed on the first and second jigs 31, 32 extending therebetween, the first electrode 21 is moved toward the second electrode 22 (that is, downward) to thereby be in contact with the weld portion A1 of the high-tensile steel plate P1.

From this state, the first electrode 21 further moves downward, thereby pressing down the weld portion A1 of the high-tensile steel plate P1 and the weld portion A2 of the low-tensile steel plate P2. As a result, as shown in FIG. 2, the high-tensile steel plate P1 and the low-tensile steel plate P2 are bent to protrude downward, and the weld portion A2 of the low-tensile steel plate P2 comes into contact with the second electrode 22. That is, the bending device 3 is configured to press the weld portion A1 of the high-tensile steel plate P1 with the first electrode 21 so as to bend the high-tensile steel plate P1.

The resistance spot welding apparatus 1, while bending the high-tensile steel plate P1, supplies an electric current between the first and second electrodes 21, 22 to weld the high-tensile steel plate P1 and the low-tensile steel plate P2. That is, the resistance spot welding apparatus 1 is configured to perform welding while compressing the high-tensile steel plate P1 in a direction intersecting the thickness direction of the high-tensile steel plate P1 (specifically, in the direction parallel to the plate surface).

In the present embodiment, the low-tensile steel plate P2 is pulled by the bending device 3 at the time of welding in the direction intersecting the thickness direction. The tensile stress imposed on the weld portion A2 of the low-tensile steel plate P2 is, however, smaller than the tensile stress that would cause cracking. Thus, no cracking occurs in the low-tensile steel plate P2.

Figure 3:
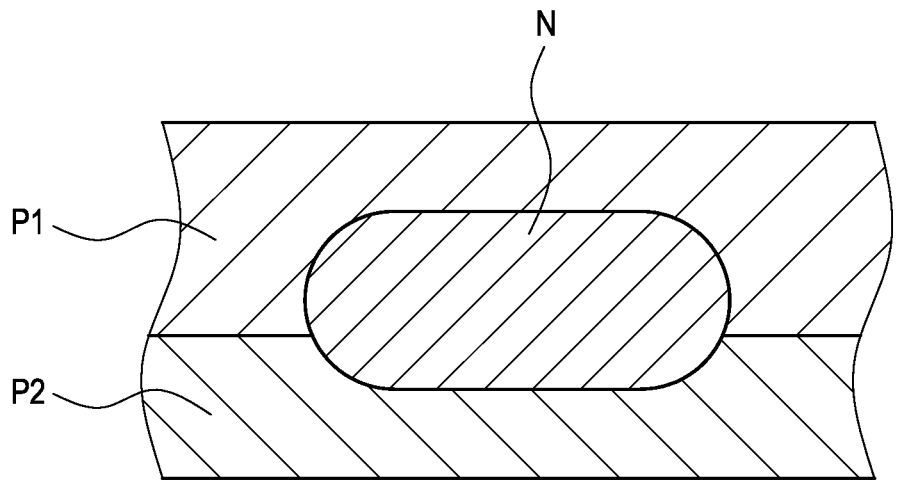
FIG. 3 is a schematic cross-sectional diagram showing welded steel plates.

As shown in FIG. 3, as a result of welding with the resistance spot welding apparatus 1, the high-tensile steel plate P1 and the low-tensile steel plate P2 of the workpiece W are joined in the thickness direction by a nugget N. The resistance spot welding apparatus 1 compresses the high-tensile steel plate P1 in a manner so that compressive stress is applied in the vicinity of the surface (the upper surface, in the present embodiment) of the high-tensile steel plate P1 that is away from the center of gravity of the nugget N in the thickness direction.

1-2. Method of Manufacturing

Figure 4:
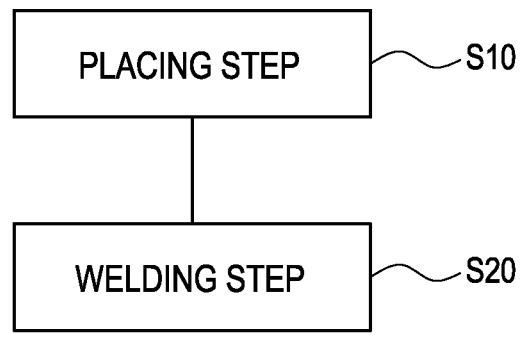
FIG. 4 is a flowchart illustrating a method of resistance spot welding according to an embodiment.

The method of resistance spot welding shown in FIG. 4 comprises a placing step S10 and a welding step S20. The method of resistance spot welding according the present embodiment is implemented with, for example, the resistance spot welding apparatus 1 in FIG. 1.

<Placing Step>

In this step, the workpiece W, including the high-tensile steel plate P1 and the low-tensile steel plate P2 overlapping in the thickness direction, is placed onto the first and second jigs 31, 32 so that the low-tensile steel plate 2 is positioned on the lower side.

<Welding Step>

In this step, the high-tensile steel plate P1 and low-tensile steel plate P2 in the overlapping state are welded with the resistance spot welding apparatus 1.

In this step, the weld portion A1 of the high-tensile steel plate P1 is pressed with the first electrode 21 to thereby bend the high-tensile steel plate P1 in the direction so that the weld portion A1 of the high-tensile steel plate P1, which comes into contact with the first electrode 21, is positioned inside of the bend. That is, welding is performed while the high-tensile steel plate P1 is compressed in the direction intersecting the thickness direction of the high-tensile steel plate P1 (specifically, in the direction parallel to the plate surface) in this step.

1-3. Effects

In the embodiment described in detail above, the following effects can be achieved.

(1a) Generating the compressive stress in the high-tensile steel plate P1 results in canceling the tensile stress generated in the high-tensile steel plate P1 at the time of welding. This inhibits LME-induced cracking in the high-tensile steel plate P1 irrespective of the degrees of the tensile strengths of the steel plates P1, P2 to be welded.

(1b) Bending the high-tensile steel plate P1 allows compressing the high-tensile steel plate P1 with a relatively simple structure. This can reduce the equipment cost of the resistance spot welding apparatus 1 and reliably inhibit LME-induced cracking.

(1c) Bending the high-tensile steel plate P1 by pressing it with the first electrode 21 leads to use of the first and second electrodes 21, 22 of the resistance spot welding apparatus 1 for relatively easy bending of the high-tensile steel plate P1. This can simplify the structure of the resistance spot welding apparatus 1.

2. Other Embodiments

An embodiment of the present disclosure has been described hereinabove; the present disclosure, however, should not be limited to the above-described embodiment and may be carried out in variously modified manners.

(2a) In the resistance spot welding apparatus 1 and the method of resistance spot welding of the above-described embodiment, the high-tensile steel plate P1 may be bent by some means other than pressing it with the first electrode 21. For example, the bending device 3 may comprise a jig (or jigs) that holds the high-tensile steel plate P1 in a bent manner.

(2b) In the resistance spot welding apparatus 1 and the method of resistance spot welding of the above-described embodiment, the high-tensile steel plate P1 is only required to be compressed in the direction intersecting the thickness direction and, thus, does not have to be bent. The resistance spot welding apparatus 1 may comprise, for example, a mechanism that applies compression force to the ends of the high-tensile steel plate P1 in the direction parallel to the plate surface to a degree not to cause plastic deformation (in other words, within a degree of elastic deformation).

(2c) In the resistance spot welding apparatus 1 and the method of resistance spot welding of the above-described embodiment, the workpiece W may include three or more steel plates. In other words, one or more steel plate(s) may be interposed between the high-tensile steel plate P1 and the low-tensile steel plate P2.

(2d) In the resistance spot welding apparatus 1 and the method of resistance spot welding of the above-described embodiment, the low-tensile steel plate P2 may be placed on top of the high-tensile steel plate P1. Moreover, the direction in which the first electrode 21 and the second electrode 22 face each other (in other words, the direction in which the workpiece W is interposed therebetween) is not limited to the vertical direction. The first and second electrodes 21, 22 may be disposed, for example, such that the workpiece W is interposed therebetween in the horizontal direction.

(2e) Functions of one component in the aforementioned embodiments may be achieved by two or more components, and a function of one component may be achieved by two or more components. Moreover, functions of two or more components may be achieved by one component, and a function achieved by two or more components may be achieved by one component. Furthermore, part of the configurations of the aforementioned embodiments may be omitted. At least part of the configurations of the aforementioned embodiments may be added to or replaced with other configurations of the aforementioned embodiments. Any mode included in the technical ideas identified by the language in the claims are embodiments of the present disclosure.

What is claimed is:

1. A method of resistance spot welding, the method comprising welding a workpiece with a resistance spot welding apparatus, the workpiece including two or more steel plates in an overlapping state in a thickness direction,
   the two or more steel plates including at least one steel plate coated with zinc,
   the resistance spot welding apparatus including:
      a first electrode configured to move in up-and-down directions, to thereby be downwardly in contact with a high-tensile steel plate having a tensile strength higher than a tensile strength of another steel plate among the two or more steel plates; and
      a second electrode configured to be upwardly in contact with the workpiece, to thereby interpose such that the workpiece is interposed between the second electrode and the first electrode, and
   the welding comprising:
      in a state where the first electrode is in contact with the high-tensile steel plate arranged furthest above the workpiece and the second electrode is not in contact with the other steel plate, moving the first electrode downwards with the second electrode remaining fixed, to thereby place all of the two or more steel plates in a bent state holding all of the two or more steel plates by a jig in a bent manner in a direction so that a weld portion of the high-tensile steel plate, which is to be in contact with the first electrode, is positioned inside of a bend and place the other steel plate in a contact state with the second electrode; and
      holding the bent state and the contact state by a jig arranged below the workpiece, to thereby compress the high-tensile steel plate in a direction intersecting a direction of a thickness of the high-tensile steel plate while welding, to thereby cancel a tensile stress generated in the high-tensile steel plate while welding, and the jig including a first jig and a second jig that are arranged so as to interpose an imaginary line connecting a leading end of the first electrode and a leading end of the second electrode.

2. The method of resistance spot welding according to claim 1,
wherein the bending the high-tensile steel plate is performed by pressing the weld portion of the high-tensile steel plate with the first electrode.

3. A resistance spot welding apparatus configured to weld a workpiece including two or more steel plates in an overlapping state in a thickness direction, the resistance spot welding apparatus comprising:
a first electrode configured to move in up-and-down directions, to thereby be downwardly in contact with a high-tensile steel plate having a tensile strength higher than a tensile strength of another steel plate among the two or more steel plates;
a second electrode configured to be upwardly in contact with the workpiece, to thereby interpose such that the workpiece is interposed between the second electrode and the first electrode and the second electrode, and
a bending device including a jig configured to hold all of the two or more steel plates in a bent manner in a direction so that a weld portion of the high-tensile steel plate, which is to be in contact with the first electrode, is positioned inside of a bend,
the two or more steel plates including at least one steel plate coated with zinc, and
the resistance spot welding apparatus being configured to:
in a state where the first electrode is in contact with the high-tensile steel plate arranged furthest above the workpiece and the second electrode is not in contact with the other steel plate, move the first electrode downwards with the second electrode remaining fixed, to thereby place all of the two or more steel plates in a bent state in a direction so that a weld portion of the high-tensile steel plate, which is to be in contact with the first electrode, is positioned inside of a bend; and
hold the bend state maintain the bent manner all the two or more steel plates by the jig, to thereby compress the high-tensile steel plate in a direction intersecting a direction of a thickness of the high-tensile steel plate while welding, to thereby cancel a tensile stress generated in the high-tensile steel plate while welding, and
the jig including a first jig and a second jig that are arranged so as to interpose an imaginary line connecting a leading end of the first electrode and a leading end of the second electrode.

4. The resistance spot welding apparatus according to claim 3,
wherein the bending device is configured to press the weld portion of the high-tensile steel plate with the first electrode so as to bend the high-tensile steel plate.

* * * * *